United States Patent [19]

Hull et al.

[11] Patent Number: 5,282,963
[45] Date of Patent: Feb. 1, 1994

[54] MAGNETICALLY ATTACHED MAGNET FOR OIL FILTERS

[76] Inventors: Harold L. Hull, 401 Canyon Way #43, Sparks, Nev. 89434; Albert B. Currey, Rte. 1 Box 186, Eucha, Okla. 74342

[21] Appl. No.: 959,336

[22] Filed: Oct. 13, 1992

[51] Int. Cl.⁵ .............................. B01D 35/06
[52] U.S. Cl. ............................ 210/223; 96/1
[58] Field of Search .......... 210/222, 223; 55/100; 335/302, 305

[56] References Cited

U.S. PATENT DOCUMENTS

| | | | |
|---|---|---|---|
| Re. 23,570 | 11/1952 | Clark | 335/302 |
| 3,480,145 | 11/1969 | Gladden | 210/223 |
| 4,218,320 | 8/1980 | Liaw | 210/223 |
| 4,446,019 | 5/1984 | Robinson | 210/223 |
| 4,450,075 | 5/1984 | Krow | 210/223 |
| 4,501,660 | 2/1985 | Hebert | 210/209 |
| 4,629,558 | 12/1986 | Garrity | 210/130 |
| 4,763,092 | 8/1988 | Tomita | 335/305 |
| 4,826,592 | 5/1989 | Taylor | 210/223 |
| 4,851,116 | 7/1989 | Tomita | 210/222 |
| 4,894,153 | 1/1990 | Shirdavani | 210/222 |
| 5,078,871 | 1/1992 | McCready | 210/222 |
| 5,089,129 | 2/1992 | Brigman | 210/223 |

Primary Examiner—Matthew O. Savage

[57] ABSTRACT

A permanent magnet is disclosed for enhancing the performance of filters, particularly oil filters associated with internal combustion engines. The permanent magnet is attached to the bottom of the filter by its own magnetic attraction to the bottom metal portion of the end of the filter canister and requires no other means of attachment. A screwdriver slot is also provided to enable a screwdriver to be inserted to pry off the magnet from the filter canister when necessary. The magnet is re-usable and may be made in various sizes and shapes to fit the contour of the bottom of the canister.

3 Claims, 1 Drawing Sheet

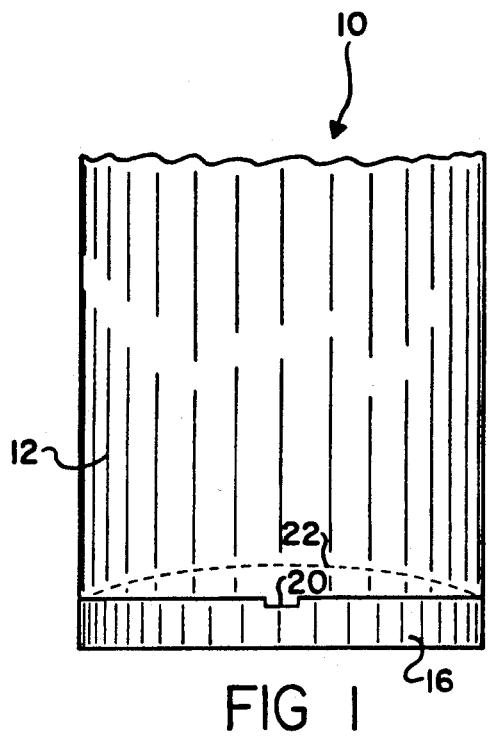
FIG 1
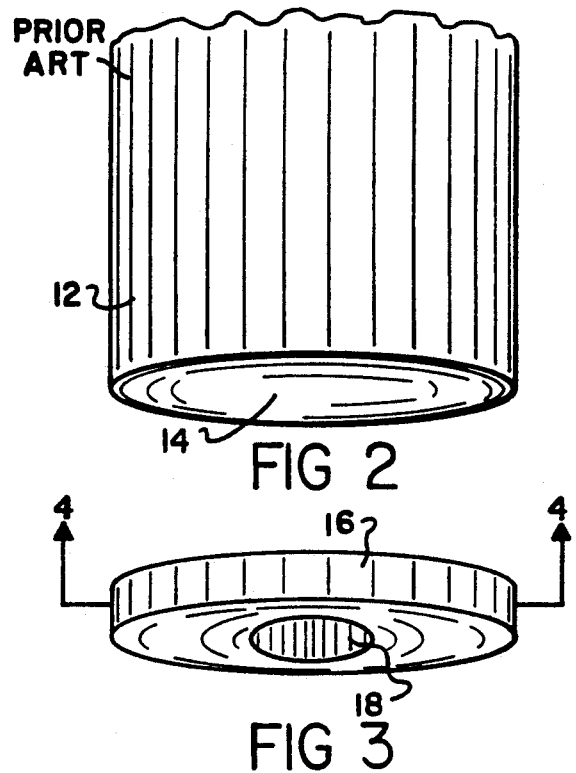
FIG 2
FIG 3
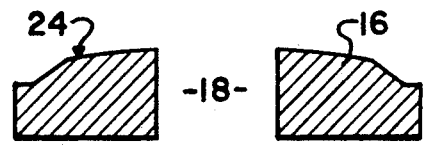
FIG 4
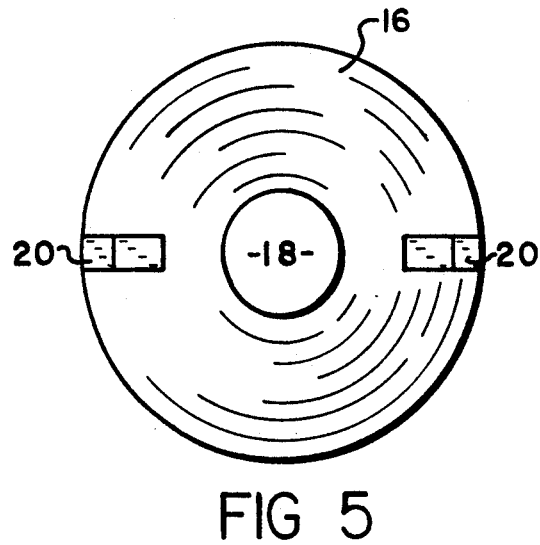
FIG 5

MAGNETICALLY ATTACHED MAGNET FOR OIL FILTERS

FIELD OF THE INVENTION

This invention relates to oil filters and more particularly to disposable canisters having magnetic attachments to trap metal particles.

BACKGROUND OF THE INVENTION

As the internal combustion engine continues to develop the need increases to provide a clean supply of lubricating oil and especially as R.P.M.s increase, the requirement for clean oil is even greater.

The most important time in the life of an engine is the "break-in" period which can be the first 1,000 miles or more, as during this time the moving parts are "seating" themselves and more particles of metal are suspended in the oil than at any other time during the life of the engine.

Today, the filtering mechanisms have evolved into disposable canisters through which a portion of the oil is circulated and particles greater than 20 microns in size are trapped and collected. The present day canister is deficient in removing abrasive ferrous particles of less than 20 microns in size.

In the past, a number of attempts have been made to include in or on the canister, magnetic means to attract these ferrous particles which include the wrap around coil of U.S. Pat. No. 4,218,320 or the magnetic attachment of U.S. Pat. No. 4,894,153 or the combination apparatus of U.S. Pat. No. 4,826,592 which include a wire coil with the bottom portion of a cup having small magnets. Also, the permanently adhering plastic strip of U.S. Pat. No. 5,078,871 is noted which is thrown away when changing canisters. These devices have inherent problems which the present invention overcomes. The magnet of the present invention does not need any other means other than its own permanent magnetic field to attach it to the bottom of the oil filter as the shape of the magnet conforms to the size and shape of the bottom metal portion of the canister.

SUMMARY OF THE INVENTION

It is therefore a primary object to provide a magnet of a size and shape to conform and magnetically adhere to the bottom metal portion of an oil canister.

It is yet another object to provide means to pry off the magnet from a used canister by means of a screwdriver slot.

It is another important object to provide the magnet in a number of sizes to conform to various canisters.

BRIEF DESCRIPTION OF THE DRAWINGS

FIG. 1 is an overview of the magnet attached to the bottom portion of a canister.

FIG. 2 is a perspective view of a bottom portion of a prior art canister showing a curved metal bottom.

FIG. 3 is a perspective view of the magnet.

FIG. 4 is a section taken at 4—4 of FIG. 3.

FIG. 5 is a top view of the magnet.

DETAILED DESCRIPTION OF THE DRAWINGS

Referring now in detail to the drawings wherein like characters refer to like elements throughout the various drawings, 10 is an overview showing our new magnet affixed to the concaved, bottom portion 14 (also depicted in FIG. 1 by ghost line 22), of a throw-away oil filter canister 12 as commonly used for filtering the oil of an internal combustion engine in a vehicle such as an automobile. The top portion of the canister is not shown as it may take several forms such as spin-on connections, etc. 16 is a powerful magnet such as an earth magnet which may have a bore 18 through its center that also has a mating curve depicted by arrow 24, to match the bottom concave portion 14 of canister 12, while 20 are screwdriver slots formed in the magnet to receive a screwdriver to enable the magnet to be removed from the canister.

It will now be seen that the magnet as shown and considered by the inventors to be the invention is a powerful magnet which can simply be attached by its own magnetic force-field to the bottom portion of a canister and will cause the abrasive ferrous particles of even less than 20 microns to magnetically cling to the interior bottom of the canister.

It will also be noted than no other apparatus is needed or necessary to hold the magnet in place as does the other prior art.

Also, a screwdriver slot is formed in the magnet to allow a screwdriver to be inserted to remove the canister from the powerful magnet when changing the canister.

It will also be noted that the magnet of the present invention can be used many times with different canisters and may also be manufactured in a number of sizes and shapes as required.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is:

1. A fluid filter comprising:
    a cylindrical housing formed of a magnetically attractable metal and having a concave end surface;
    filter means disposed within said housing for removing particulate matter from a fluid;
    a generally disc-shaped permanent magnet magnetically attached to the concave end surface of said housing, said magnet having a convex mating surface configured to contactingly mate with the concave end surface of said housing, wherein the convex mating surface of said magnet includes at least one slot that extends radially inwardly from a peripheral edge thereof, wherein each said slot forms an opening between the convex surface of said magnet and the concave end surface of said housing, said opening being configured to receive a tool for prying the magnet from said concave end;
    whereby when said convex mating surface of said magnet is mated to the concave end surface of said housing, said metallic end is magnetized providing a magnetic force field for attracting magnetic particles to said metallic end.

2. The fluid filter of claim 1, wherein said permanent magnet includes a bore extending axially through a center portion thereof.

3. The fluid filter of claim 1, wherein a diameter of said disk-shaped magnet is substantially equal to a diameter of said housing.

* * * * *